May 20, 1930.    R. C. ALLEN    1,759,338
COUPLING
Filed April 30, 1929
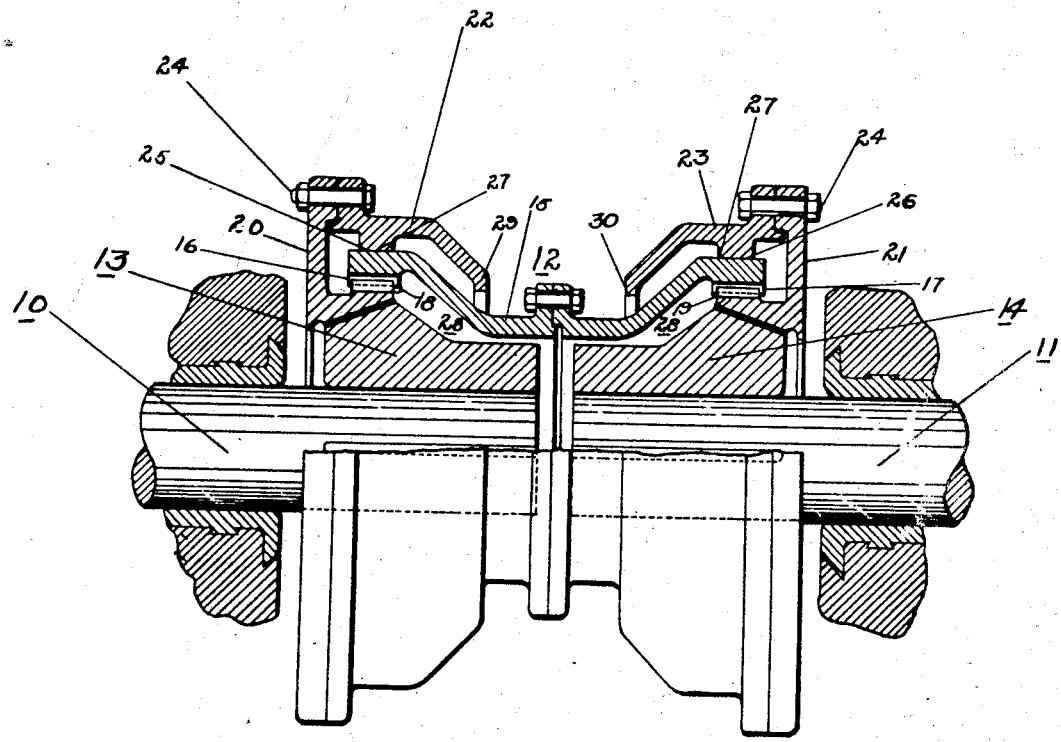
WITNESS
E. Lutz
INVENTOR
R.C.ALLEN.
BY
A. B. Reavis
ATTORNEY Patented May 20, 1930

1,759,338

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

COUPLING

Application filed April 30, 1929. Serial No. 359,303.

My invention relates to flexible shaft couplings and more particularly to those of the gear tooth type, such as are disclosed in U. S. Letters Patent to Gustave Fast, No. 1,356,860 and No. 1,641,669 patented October 26, 1920 and September 6, 1927, respectively; and it has for an object to provide a coupling of the type referred to which is of improved construction and arrangement of parts.

In couplings of the type referred to, a hub member is fixed to the end of each of the abutting shafts, and a connecting sleeve telescopes over the hubs. The driving connection is provided by rows of intermeshing teeth on the shaft hubs and the adjacent ends of the connecting sleeve, respectively. The intermeshing teeth have a certain amount of clearance to take care of any misalignment of the two shafts. In order to eliminate excessive sliding between the teeth, annular bearings are provided between the sleeve and hubs, the middle planes of which are coincident with the middle planes of the adjacent sets of intermeshing teeth.

Heretofore, the annular bearings have been located inside of the rows of intermeshing teeth. In order to do this, it has been necessary to undercut the shaft hubs, which obviously results in the weakening of the structure. The annular bearings have also been located outside of the rows of intermeshing teeth; but in the constructions of this kind heretofore known to me, the internal teeth have been provided on the shaft hubs and the external teeth on the sleeve, thus necessitating the provision of a relatively weak flange on the shaft hub.

More particularly, therefore, it is an object of this invention to provide a coupling of the gear-tooth type which is extremely durable, is simple and one which is relatively cheap to manufacture.

The single figure on the drawing is a part side elevation and a part longitudinal sectional view of a shaft coupling constructed in accordance with my invention.

According to the embodiment of my invention shown on the accompanying drawing, I provide a coupling comprising a sleeve having a row of internal teeth at each end thereof, a separate shaft hub disposed within each end of the sleeve and provided with a row of teeth meshing with the teeth on the sleeve, a separate annular member surrounding each end of the sleeve and secured to the adjacent shaft hub, and an annular bearing between each annular member and the adjacent end of the sleeve and disposed in a plane extending transverse to and midway the length of the adjacent rows of intermeshing teeth. By reason of this construction, no undercutting is necessary, and as the teeth on the shaft hubs are external, relatively weak flanges are eliminated.

Referring now in detail to the construction illustrated, it will be observed that I have shown a pair of shafts 10 and 11 disposed in end-to-end relation and connected by means of a flexible coupling of the gear-tooth type, indicated in general by the reference character 12.

The coupling comprises a pair of hub members 13 and 14 keyed to the shafts 10 and 11, respectively. A two-part sleeve 15 encircles the hub members and is provided at each end with rows of internal teeth 16 and 17 which mesh with rows of external teeth 18 and 19, formed on the hub members 13 and 14, respectively. It will be observed that a slight clearance is provided between the rows of intermeshing teeth so as to take care of any misalignment that might occur between the two shafts.

The hub members 13 and 14 are provided with radial end flanges 20 and 21, respectively. Annular members 22 and 23 encircle the ends of the sleeve and are firmly secured by bolts 24 to the outer edges of the radial flanges 18 and 19, respectively.

An annular bearing 25 is provided between the annular member 22 and the adjacent end of the sleeve, and likewise an annular bearing 26 between the annular member 23 and the adjacent end of the sleeve. The annular bearings are provided by integral rings 27 formed on the inner surface of the annular members and engaging the outer surface of the ends of the sleeve.

The hub members and sleeve provide an annular space 28 which is filled with lubricant. The lubricant will be forced between the intermeshing teeth and to the annular bearings by centrifugal force. The annular members 22 and 23 are so formed as to provide lip portions 29 and 30 for preventing the escape of lubricant.

From the foregoing, it will be observed that the annular bearings are disposed in planes which extend transverse to and intermediate the length of the adjacent intermeshing teeth, so as to give the minimum amount of sliding between the teeth, and at the same time, the undercutting and relatively weak flanges referred to above have been eliminated.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A flexible shaft coupling comprising in combination a sleeve having a row of internal teeth, a shaft hub having a row of external teeth meshing with the teeth on the sleeve, an annular member secured to the hub member and encircling the sleeve member, and an annular bearing between the annular member and the sleeve and disposed in a plane extending transverse to and intermediate the length of the intermeshing teeth.

2. A flexible shaft coupling comprising in combination a sleeve having a row of internal teeth, a shaft hub having a row of external teeth meshing with the teeth on the sleeve and including a radial end flange, and an annular member encircling the sleeve member and secured at one end thereof to the radial end flange, the annular member including an inner ring portion engaging the outer surface of the sleeve member to form an annular bearing, the bearing being arranged in a plane extending transverse to and intermediate the length of the intermeshing teeth.

3. The combination with a pair of rotating shafts disposed in end-to-end relation; of a flexible coupling for the shafts including a hub member fixed to an end of one of the shafts and having a row of external teeth, a sleeve member having at one end thereof a row of internal teeth meshing with the teeth on the hub and operatively connected at the other end thereof to the other of said shafts, an annular member encircling the sleeve and secured to the hub member, and an annular bearing between the annular member and the sleeve and disposed in a plane extending transverse to and intermediate the length of the intermeshing teeth.

4. A flexible shaft coupling comprising in combination a sleeve having at each end thereof a row of internal teeth, a separate shaft hub disposed within each end of the sleeve and having a row of external teeth meshing with the internal teeth on the sleeve, a separate annular member secured to each of the shaft hubs and encircling an end of the sleeve and an annular bearing between each annular member and the adjacent end of the sleeve, each annular bearing being disposed in a plane extending transversely to and intermediate the length of the adjacent intermeshing teeth.

In testimony whereof, I have hereunto subscribed my name this 24th day of April, 1929.

ROBERT C. ALLEN.